US008977876B2

(12) United States Patent
Yang et al.

(10) Patent No.: US 8,977,876 B2
(45) Date of Patent: Mar. 10, 2015

(54) METHOD AND APPARATUS FOR IMPLEMENTING LOW POWER CONSUMPTION FOR DATA SWITCHING DEVICE, AND DATA SWITCHING DEVICE THEREOF

(71) Applicant: Huawei Technologies Co., Ltd., Shenzhen (CN)

(72) Inventors: Xueren Yang, Beijing (CN); Jianzhao Li, Shenzhen (CN); Wen Xiao, Shenzhen (CN); Yong Wang, Nanjing (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 0 days.

(21) Appl. No.: 13/828,577

(22) Filed: Mar. 14, 2013

(65) Prior Publication Data
US 2013/0205155 A1  Aug. 8, 2013

Related U.S. Application Data

(63) Continuation of application No. PCT/CN2011/083763, filed on Dec. 9, 2011.

(51) Int. Cl.
*H04B 7/185* (2006.01)
*G06F 1/32* (2006.01)
(Continued)

(52) U.S. Cl.
CPC .............. *G06F 1/3234* (2013.01); *H04L 12/12* (2013.01); *Y02B 60/34* (2013.01); *Y02B 60/32* (2013.01); *H04L 49/40* (2013.01)
USPC ............................... 713/320; 370/318; 710/18

(58) Field of Classification Search
CPC ........ G06F 1/3203; H04L 12/12; H04L 49/40
USPC .......... 370/318, 229, 235, 296, 401; 709/220; 714/4.2; 710/18
See application file for complete search history.

(56) References Cited

U.S. PATENT DOCUMENTS 6,791,942 B2 *  9/2004  Jin ................................. 370/229
7,730,343 B2 *  6/2010  Bayus et al. ................... 714/4.2
(Continued)

FOREIGN PATENT DOCUMENTS

CN          1507208 A        6/2004
CN          1801735 A        7/2006
(Continued)

OTHER PUBLICATIONS

International Search Report issued in corresponding PCT Application No. PCT/CN2011/081948; mailed Feb. 16, 2012.
(Continued)

*Primary Examiner* — Thomas Lee
*Assistant Examiner* — Aurel Prifti
(74) *Attorney, Agent, or Firm* — Brinks Gilson & Lione (57) ABSTRACT

An apparatus for implementing low power consumption for data switching device includes a dormancy management module that controls an upper layer logic component in a device to enter a low power consumption state when a current state parameter of the device satisfies a preset dormancy configurationcondition; detects whether an energy consumption state of a transmission medium is active; and wakes up the upper layer logic component in the device to enter a normal working state if the energy consumption state of the transmission medium is active. When a preset condition is satisfied, upper layer logic components such as a CPU, a network processor and an optical module in the device, properly stop full-time operation to save energy.

10 Claims, 6 Drawing Sheets

(51) Int. Cl.
*H04L 12/12* (2006.01)
*H04L 12/931* (2013.01)

(56) References Cited

U.S. PATENT DOCUMENTS

| | | | |
|---|---|---|---|
| 8,194,548 B2* | 6/2012 | Diab et al. | 370/235 |
| 8,219,721 B2* | 7/2012 | Shan et al. | 710/18 |
| 2003/0010613 A1* | 1/2003 | Quapil | 200/43.01 |
| 2008/0212964 A1 | 9/2008 | Gao et al. | |
| 2009/0052372 A1* | 2/2009 | Durazzo et al. | 370/318 |
| 2009/0157865 A1* | 6/2009 | Winter | 709/224 |
| 2009/0303883 A1* | 12/2009 | Kucharczyk et al. | 370/241 |
| 2009/0327506 A1 | 12/2009 | Diab | |
| 2010/0005327 A1* | 1/2010 | Murata | 713/320 |
| 2010/0070659 A1* | 3/2010 | Ma et al. | 710/14 |
| 2010/0083026 A1* | 4/2010 | Millet et al. | 713/601 |
| 2010/0171602 A1* | 7/2010 | Kabbara et al. | 340/333 |
| 2010/0235490 A1* | 9/2010 | Nasnas | 709/224 |
| 2010/0266274 A1 | 10/2010 | Zhang et al. | |
| 2010/0274943 A1* | 10/2010 | Mahadevan et al. | 710/316 |
| 2011/0142060 A1* | 6/2011 | Manral | 370/401 |
| 2011/0145445 A1* | 6/2011 | Malamant et al. | 710/16 |
| 2011/0191608 A1 | 8/2011 | Vetteth | |
| 2011/0213865 A1* | 9/2011 | Durazzo et al. | 709/220 |
| 2012/0027061 A1 | 2/2012 | Wang et al. | |
| 2012/0030381 A1* | 2/2012 | Singh et al. | 710/16 |
| 2012/0163175 A1* | 6/2012 | Gupta | 370/235 |
| 2012/0228936 A1* | 9/2012 | Kabbara et al. | 307/29 |
| 2012/0287829 A1* | 11/2012 | Chang et al. | 370/296 |
| 2012/0311141 A1* | 12/2012 | Durazzo et al. | 709/224 |

FOREIGN PATENT DOCUMENTS

| | | |
|---|---|---|
| CN | 1859438 A | 11/2006 |
| CN | 101197634 A | 6/2008 |
| CN | 101494602 A | 7/2009 |
| CN | 101498964 A | 8/2009 |
| EP | 2234325 A1 | 9/2010 |
| WO | WO 99/54806 A1 | 10/1999 |

OTHER PUBLICATIONS

Cisco "IEEE 802.3az Energy Efficient Ethernet: Build Greener Networks" Intel © 2011.

IEEE Computer Society, "Part 3: Carrier sense multiple access with collision detection (CSMA/CD) access method and physical layer specifications" IEEE Std 802.3, 2005, 628 pages.

* cited by examiner

METHOD AND APPARATUS FOR IMPLEMENTING LOW POWER CONSUMPTION FOR DATA SWITCHING DEVICE, AND DATA SWITCHING DEVICE THEREOF

CROSS-REFERENCE TO RELATED APPLICATIONS

This application is a continuation of International Application No. PCT/CN2011/083763, filed on Dec. 9, 2011, which is hereby incorporated by reference in its entirety.

FIELD OF THE APPLICATION

The present application relates to communications technologies, and in particular, to a method and an apparatus for implementing low power consumption for data switching device, and a data switching device thereof.

BACKGROUND OF THE APPLICATION

At present, network technologies are developing rapidly, and demands of high bandwidth to home and enterprise cloud services see a remarkable increase. As the most convenient access mode for high bandwidth access, local area network (LAN) access is applying for a larger and larger proportion. In addition, the future makes sufficient room for enterprise and building access by applying LAN access.

Network devices consume a large amount of electric power, and enterprise users have little demands on the network during off-work hours. To be specific, the devices may be in the idle state for ⅔ of each day, thereby causing a waste of power. To solve this technical problem, the prior art proposes the concept of energy-efficient Ethernet. The implementation requirements of the energy-efficient Ethernet are stipulated in the IEEE 802.3az standard. The IEEE 802.3az standard is the first technical standard targeting at dynamic energy saving, defines related technical parameter requirements to ensure that after a physical layer (PHY) chip transmits data, the two parties involved in data transmission negotiate to automatically enter a low power consumption mode; and when data comes, the two parties are fast woken up to enter a normal working state. This standard greatly improves dynamic energy-saving performance when the PHY chip has a service link.

However, the existing energy-efficient Ethernet technology only solves the problem of energy saving of the PHY chip. The data switching device in the Ethernet is still challenged by the phenomenon that the device operates at high power consumption because an upper layer logic component fails to automatically enter the low power consumption state. Therefore, how to enable the network device to automatically work in the low power consumption mode is a challenge to highly intelligent network devices.

SUMMARY OF THE APPLICATION

Embodiments below provide a method and an apparatus for implementing low power consumption for data switching device, and a data switching device thereof, to reduce power consumption of the device using an effective low power consumption mechanism.

A first aspect provides a method for implementing low power consumption for data switching device, including:

controlling an upper layer logic component in the device to enter a low power consumption state, when a current state parameter of the device satisfies a preset dormancy configuration condition;

detecting, by using a physical port, whether an energy consumption state of a transmission medium is active; and waking up the upper layer logic component in the device to enter a normal working state if the energy consumption state of the transmission medium is active.

A second aspect further provides an apparatus for implementing low power consumption for data switching device, including:

a low power consumption control module, configured to control an upper layer logic component in the device to enter a low power consumption state, when a current state parameter of the device satisfies a preset dormancy configuration condition; and a wake-up control module, configured to detect, by using a physical port, whether an energy consumption state of a transmission medium is active, and wake up the upper layer logic component in the device to enter a normal working state if the energy consumption state of the transmission medium is active.

A third aspect further provides data switching device, including an upper layer logic component and a physical layer chip, where the physical layer chip is arranged with a physical port, and the device further includes: the apparatus for implementing low power consumption for data switching device provided in the second aspect.

According to the method and the apparatus for implementing low power consumption for data switching device, and the data switching device provided by the embodiments, an upper layer logic component in the data switching device may be controlled to automatically enter the low power consumption state by automatically detecting the current state parameter of the device; and the energy consumption state of the transmission medium of a physical port is automatically detected and used as external wake-up information to enable the upper layer logic component to automatically enter the normal working mode. In this way, when a preset condition is satisfied, upper layer logic components, such as a central processing unit (CPU), a network processor and an optical module in the device, properly stop full-time operation to save energy.

DETAILED DESCRIPTION OF THE EMBODIMENTS

Various exemplary embodiments are described below with reference to the accompanying drawings. Other embodiments obtained by persons of ordinary skill in the art based on the embodiments without creative efforts are understood to fall within the protection and scope of the claims.

Embodiment 1

Figure 1:
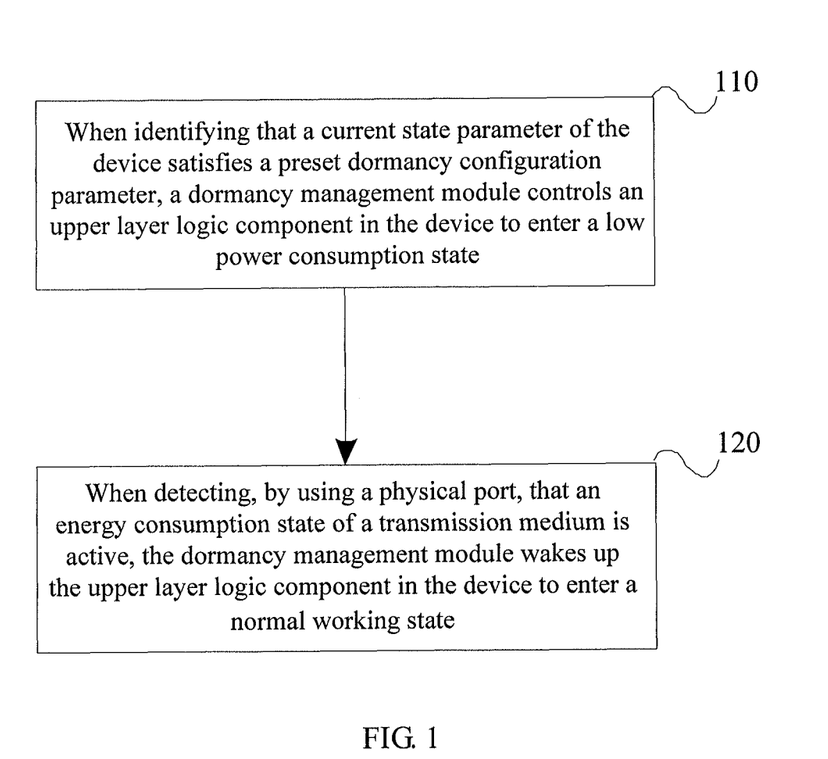
FIG. 1 is a flow chart of a method for implementing low power consumption for data switching device according to a first embodiment.

FIG. 1 is a flow chart of a method for implementing low power consumption for data switching device according to a first embodiment.

The method provided in this embodiment is applicable to the data switching device. The data switching device is a network device used to forward and exchange communication data, and may provide an electrical signal path for any two network nodes. Multiple types of transmission protocols and transmission media may be used for electrical signal transmission, among which the most commonly used is electrical signal transmission based on Ethernet or an optical fiber. For example, this type of data switching device may be a switch, a router, a gateway, or a firewall server. Structurally, the device typically includes a physical layer (PHY) chip and an upper layer logic component. The upper layer logic component controls forwarding of data packets of electrical signals between physical ports arranged on the physical layer chip. The upper layer logic component of the data switching device generally includes hardware such as a CPU and a link layer controller, and other chips such as a network processor and an optical module.

The method for implementing low power consumption for data switching device provided in this embodiment is applicable to data switching device with the above structure, and is implemented by an apparatus for implementing low power consumption for data switching device. The apparatus may also be referred to as a dormancy management module, which may be implemented in the form of hardware and/or software, integrated in a CPU, or borne in an independent chip. The method according to this embodiment specifically includes the following steps:

Step 110: When identifying that a current state parameter of the device satisfies a preset dormancy configuration parameter, a dormancy management module controls an upper layer logic component in the device to enter a low power consumption state.

Step 120: When detecting, by using a physical port, that an energy consumption state of a transmission medium is active, the dormancy management module wakes up the upper layer logic component in the device to enter a normal working state.

According to the technical solution provided in this embodiment, the dormancy configuration parameter is preset so that the dormancy management module is capable of automatically detecting whether the current state parameter of the device satisfies the preset dormancy configuration parameter, to control the upper layer logic component in the data switching device to automatically enter the low power consumption state. In addition, the energy consumption state of the transmission medium corresponding to the physical port is automatically detected and used as external wake-up information to enable the upper layer logic component to automatically enter the normal working mode. The low power consumption state may be a dormant state where operation stops absolutely, or an operation state where the dominant working frequency is lowered and a little energy is consumed. According to the above technical solution, when a preset condition is satisfied, upper layer logic components such as a CPU, a network processor and an optical module in the device, properly stop full-time operation to save energy.

In the technical solution provided in the above embodiment, the operation of identifying whether the current state parameter of the device satisfies the preset dormancy configuration parameter may be implemented in multiple ways. For example, the preset dormancy configuration parameter may be preconfigured by management personnel, and generally may be configured according to rules of using the data switching device. For example, a switch device deployed for a company is not frequently used during off-work hours, and therefore, the off-work hours may be configured to serve as a preset dormancy configuration parameter. Assuredly, another preset dormancy time period may also be configured to serve as the preset dormancy configuration parameter. Accordingly, the identifying that the current state parameter of the device satisfies the preset dormancy configuration parameter may be: determining, when identifying that current time of the device falls within the preset dormancy time period, that the current state parameter of the device satisfies the preset dormancy configuration parameter. This technical solution is capable of enabling the upper layer logic component to periodically enter a dormancy state and automatically wake up, thereby achieving a design of saving energy during the idle time period.

In the above embodiment, the case where the energy consumption state of the transmission medium is active is used as a trigger condition for waking up the upper layer logic component. The energy consumption state of the transmission medium may be detected by using multiple methods.

Preferably, the energy consumption state of the transmission medium may be detected based on the energy-efficient Ethernet technology adopted on the physical port. Accordingly, the detecting, by using the physical port, the energy consumption state of the transmission medium may be: identifying an energy detection state check bit of the physical port in a polling manner by using a serial management interface (SMI) connected to a physical chip; and determining the energy consumption state of the transmission medium corresponding to the physical port according to the identified energy detection state check bit. The energy detection state check bit is generally based on the energy-efficient Ethernet technology. When the energy consumption of the transmission medium satisfies the preset condition, the energy consumption state check bit is set. In this case, it may be determined whether the energy consumption state of the transmission medium is active by checking whether the energy detection state check bit is set. The data switching device is generally provided with a plurality of physical ports. An energy detection state check bit is configured for each of the ports. When the dormancy management module detects, in a polling manner by using an SMI connected to a certain physical port, that the energy detection state check bit is set, the energy consumption state of the transmission medium connected to the port is considered active.

Other techniques may be used to detect the energy consumption state of the transmission medium connected to the physical port, for example, some physical layer (PHY) chips use a special pin to identify the energy detection state.

Embodiment 2

Figure 2A:
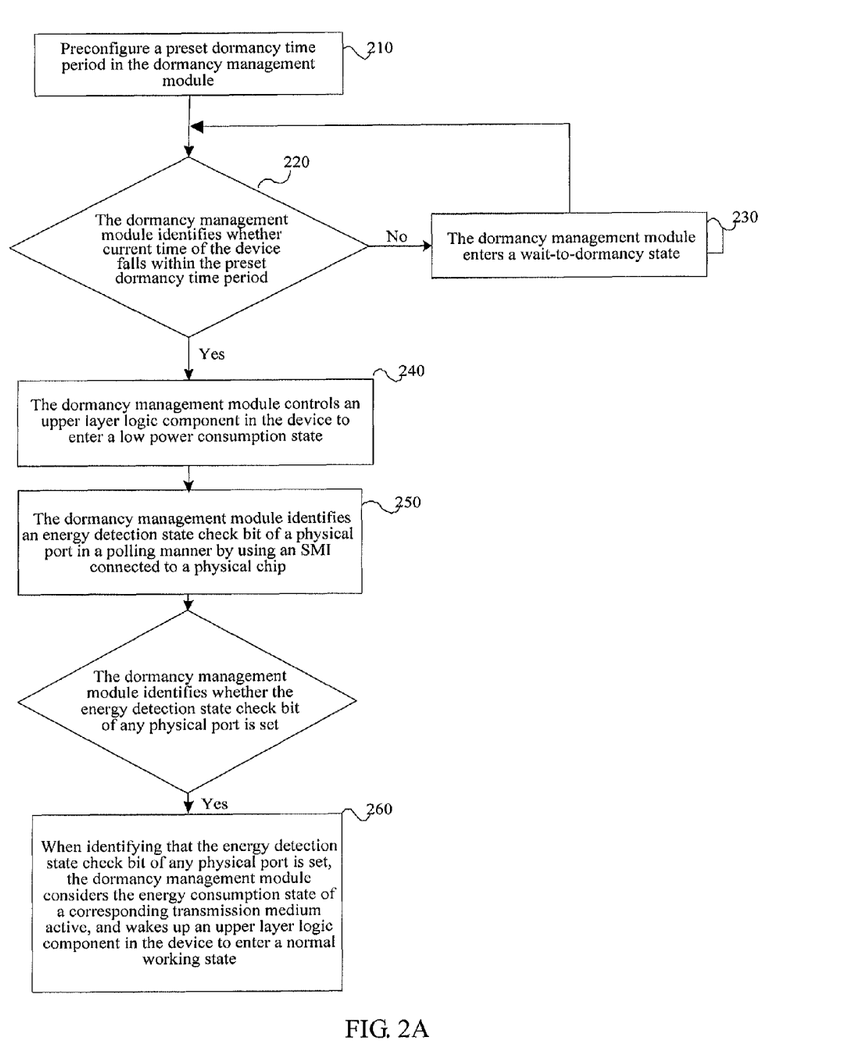
FIG. 2A is a flow chart of a method for implementing low power consumption for data switching device according to a second embodiment.
Figure 2B:
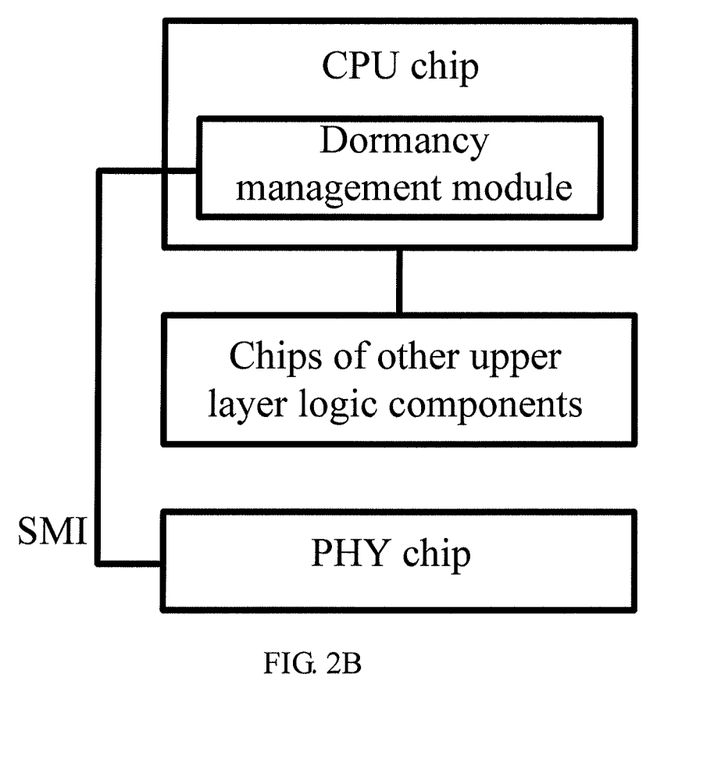
FIG. 2B is a schematic structural diagram of data switching device applicable to the second embodiment.

FIG. 2A is a flow chart of a method for implementing low power consumption for data switching device according to a second embodiment. This embodiment may be based on any of the above-described technical solutions, and in addition, a dormancy management module in this embodiment is specifically implemented by using software, and is integrated in a CPU, as shown in FIG. 2B. A CPU chip is connected to chips of other upper layer logic component, and the CPU chip is also connected to a PHY chip by using an SMI. A preferred implementation solution provided in this embodiment combines detection means using time management and a physical port, including the following steps:

Step 210: Preconfigured a preset dormancy time period in the dormancy management module. For example, as regards a company, the preset dormancy time period may be set as 16:00-8:00.

Step 220: The dormancy management module identifies whether current time of the device falls within the preset dormancy time period. For example, the dormancy management module may periodically detect current time of the device. If the current time of the device falls within the preset dormancy time period, step 240 is performed; otherwise, step 230 is performed.

Step 230: The dormancy management module enters a wait-to-dormancy state, and the process returns to step 220.

Step 240: The dormancy management module controls an upper layer logic component in the device to enter a low power consumption state.

In this embodiment, the dormancy management module is borne on the CPU. Therefore, the CPU will not completely enter a dormant state, but enters a low power consumption state where the device works slowly. The dormancy management module may forcefully lower the dominant working frequency of the CPU. In this case, other functions of the CPU are suspended, and only a little energy is consumed to support working of the dormancy management module. In addition, other upper layer logic components may enter the dormant state.

Step 250: The dormancy management module identifies an energy detection state check bit of a physical port in a polling manner by using an SMI connected to a physical chip.

Step 260: When identifying that the energy detection state check bit of any physical port is set, the dormancy management module considers an energy consumption state of a corresponding transmission medium active, and wakes up the upper layer logic component in the device to enter a normal working state.

Logic functions of the dormancy management module in the embodiments include at least the following: when the device is working normally, the dormancy management module is responsible for configuring and managing the dormancy time period, triggering the low power consumption state, and restoring the configuration when exiting the low power consumption state; when the device is in the low power consumption state, the dormancy management module detects the energy consumption detection state check bit by using the SMI interface of the PHY chip in a polling manner, and determines whether to wake up the device to enter the normal working state.

Embodiment 3

Figure 3A:
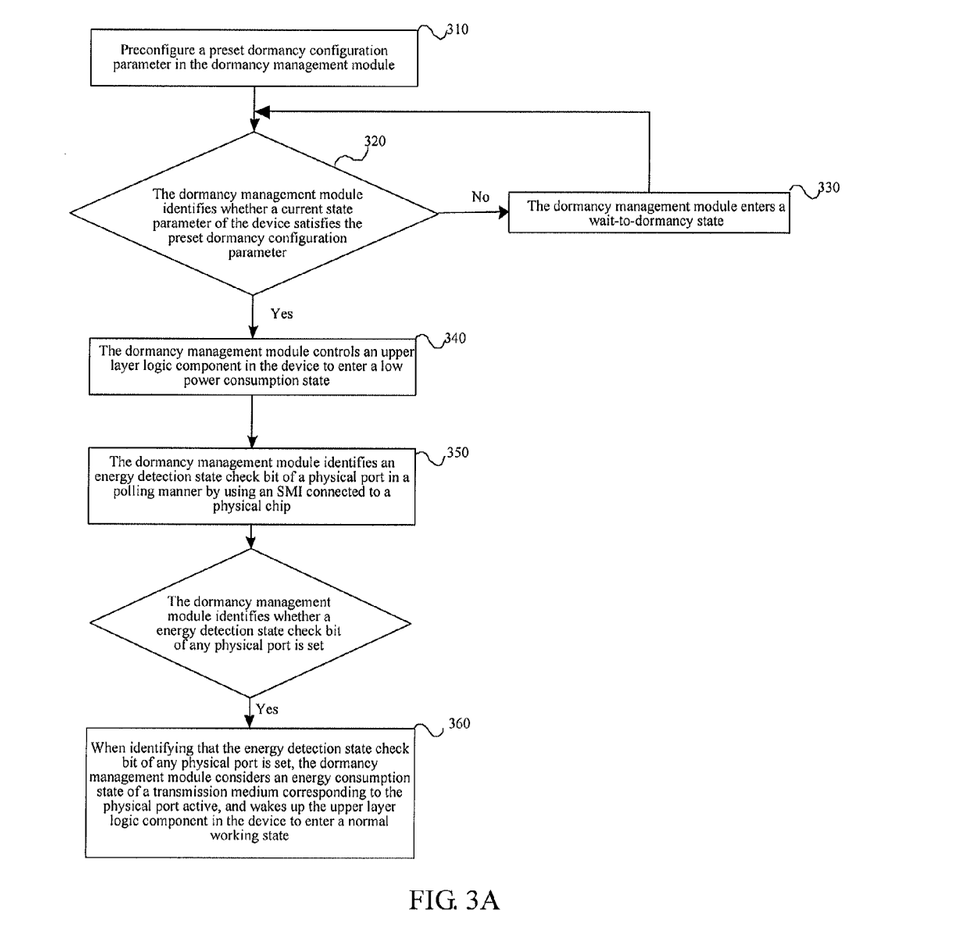
FIG. 3A is a flow chart of a method for implementing low power consumption for data switching device according to a third embodiment.
Figure 3B:
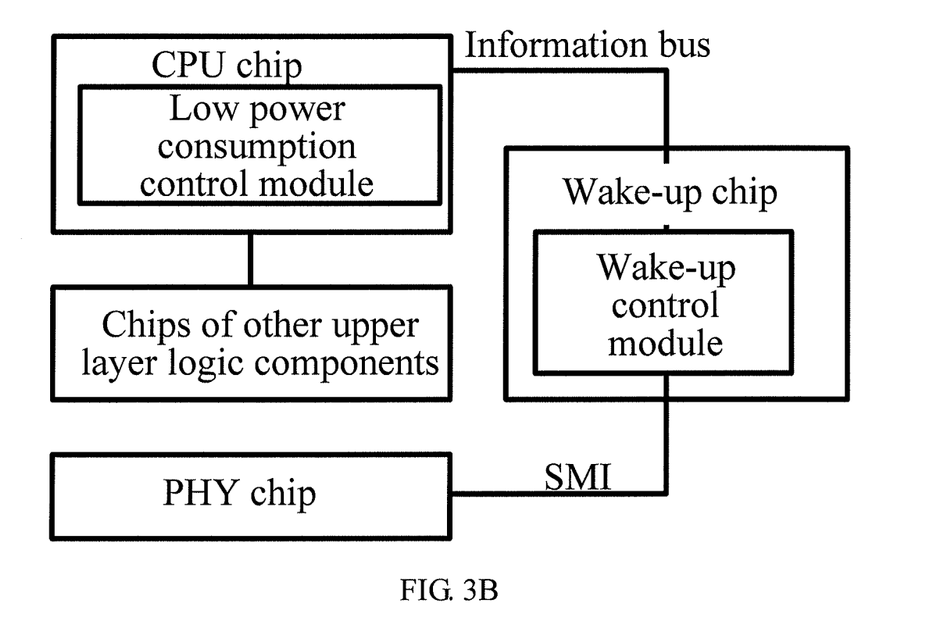
FIG. 3B is a schematic structural diagram of data switching device applicable to the third embodiment.

FIG. 3A is a flow chart of a method for implementing low power consumption for data switching device according to a third embodiment. This embodiment differs from the above embodiment in that: a dormancy management module according to this embodiment includes two logic function modules, as shown in FIG. 3B; a low power consumption control module controlling entry into the low power consumption state in the working mode is implemented by software and integrated in the CPU; and a wake-up control module controlling wake-up from the dormant mode is borne on a wake-up chip. The wake-up chip is a hardware chip independent of the CPU and chips of other upper layer logic components. The method according to this embodiment includes the following steps:

Step 310: Preconfigured a preset dormancy configuration parameter in the dormancy management module. For example, a dormancy time period is preset.

Step 320: The dormancy management module identifies whether a current state parameter of the device satisfies the preset dormancy configuration parameter; if the preset dormancy configuration parameter is satisfied, step 340 is performed; otherwise, step 330 is performed.

Step 330: The dormancy management module enters a wait-to-dormancy state, and the process returns to step 320.

Step 340: The dormancy management module controls an upper layer logic component in the device to enter a low power consumption state.

In this embodiment, the wake-up control module in the dormancy management module is borne on an independent chip. Therefore, the dormancy management module may control the CPU and other upper layer logic components to enter a dormant state. For example, the CPU is in a wake-up interruption mode, that is, the CPU enters the dormant state. Other dormant states, for example, may include low power consumption means, such as no power supply, chip reset, and chip power down.

Step 350: The dormancy management module identifies an energy detection state check bit of a physical port in a polling manner by using an SMI connected to a physical chip.

Step 360: When identifying that the energy detection state check bit of any physical port is set, the dormancy management module considers an energy consumption state of a transmission medium corresponding to the physical port active, and wakes up the upper layer logic component in the device to enter a normal working state. The entire device may be woken up by waking-up the CPU according to using interruption, thereby achieving an optimal energy-saving effect.

Embodiment 4

Figure 4:
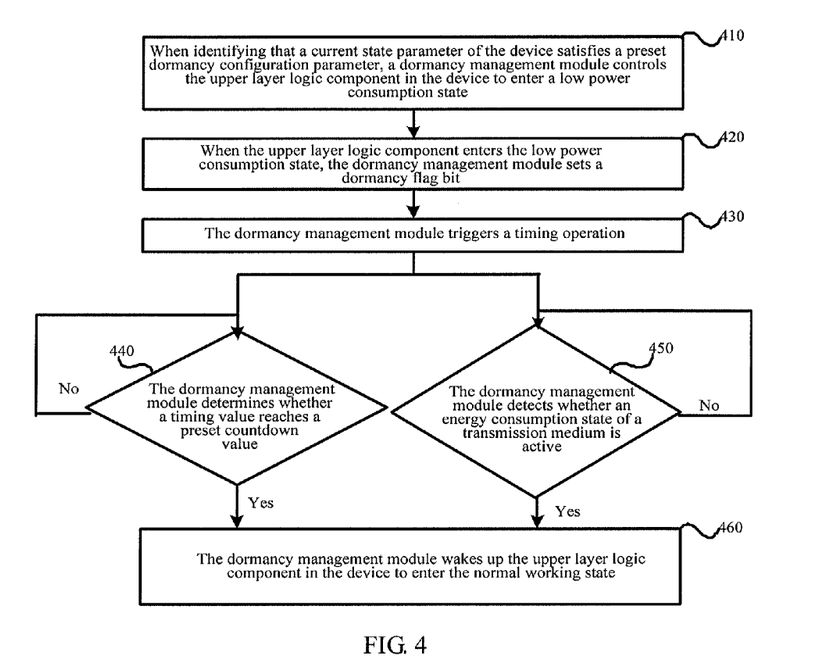
FIG. 4 is a flow chart of a method for implementing low power consumption for data switching device according to a fourth embodiment.

FIG. 4 is a flow chart of a method for implementing low power consumption for data switching device according to a fourth embodiment. This embodiment may be based on the technical solution according to any of the above-described embodiments. In addition, a countdown management method in a wake-up policy is added in this embodiment. A timing operation is triggered after an upper layer logic component in the device is controlled to enter a low power consumption state. When a timing value reaches a preset countdown value, the upper layer logic component in the device is woken up to enter a normal working state. The method according to this embodiment includes the following steps:

Step 410: When identifying that a current state parameter of the device satisfies a preset dormancy configuration parameter, a dormancy management module controls the upper layer logic component in the device to enter a low power consumption state.

Step 420: When the upper layer logic component enters the low power consumption state, the dormancy management module sets a dormancy flag bit.

Step 430: The dormancy management module triggers a timing operation.

The sequence of performing steps 420 and 430 is not limited. Step 430 may be performed prior to step 420, or the two steps may be concurrently performed.

Step 440: The dormancy management module determines whether a timing value reaches a preset countdown value; if the timing value reaches the preset countdown value, step 460 is performed; otherwise, the process returns to step 440.

Step 450: The dormancy management module detects, by using a physical port, whether an energy consumption state of a transmission medium is active; if active, step 460 is performed; otherwise, the process returns to step 450.

The detection of the countdown value in step 440 and the detection of the energy consumption state in step 450 are both trigger conditions of wake-up. The sequence of performing the two steps is not limited hereto, and the two steps may also be concurrently performed.

Step 460: The dormancy management module wakes up the upper layer logic component in the device to enter the normal working state.

In the above embodiments, change of the energy consumption state of the transmission medium corresponding to each physical port is a trigger condition of wake-up. Accordingly, it is preferred to further configure that wake-up may be triggered by change of part of the physical ports in the state of the transmission medium. In practice, there usually may be interference presented by the case where some physical ports are online activated but do not transmit any service, for example, a physical port connected to a printer. Therefore, at least one physical port may be configured to serve as a wake-up physical port. When it is detected that the energy consumption state of the transmission medium corresponding to the wake-up physical port is active, the upper layer logic component is woken up. For example, at least one physical port may also be configured to serve as a non-wake-up physical port. The case where the energy consumption state of the transmission medium corresponding to the non-wake-up physical port is active is not used as a condition for waking up the upper layer logic component. For example, the wake-up physical port may be configured by adding a preset configuration policy to the dormancy management module, or the non-wake-up physical port may also be configured by using this method. The non-wake-up physical port includes, but is not limited to, an uplink port. The dormancy management module may configure one or more non-wake-up physical ports, to form a non-wake-up physical port group, which prevents the upper layer logic component from being woken up due to the active state of the non-service transmission.

Accordingly, the step of detecting the energy consumption state of the transmission medium by using the physical port may specifically include: determining, according to a preset configuration policy, a wake-up physical port, and detecting by using the wake-up physical port the energy consumption state of a corresponding transmission medium. In this technical solution, design of a non-wake-up physical port group is capable of effectively masking false activation information of the device where activation is constantly implemented but ports are idle, such as, a network printer, a scanner, or a service uplink port.

Embodiment 5

Figure 5:
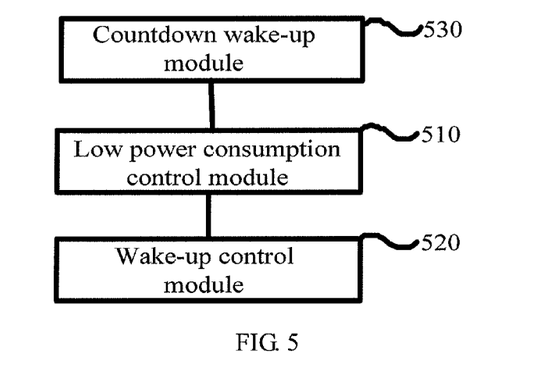
FIG. 5 is a schematic structural diagram of an apparatus for implementing low power consumption for data switching device according to a fifth embodiment.

FIG. 5 is a schematic structural diagram of an apparatus for implementing low power consumption for data switching device according to a fifth embodiment. The apparatus includes a low power consumption control module 510 and a wake-up control module 520, where the low power consumption control module 510 is configured to, when identifying that a current state parameter of the device satisfies a preset dormancy configuration parameter, control an upper layer logic component in the device to enter a low power consumption state; and the wake-up control module 520 is configured to, when detecting, by using a physical port, that an energy consumption state of a transmission medium is active, wake up the upper layer logic component in the device to enter a normal working state.

In a preferred solution, the low power consumption control module may be specifically configured to, when identifying that current time of the device falls within a preset dormancy time period, determine that the current state parameter of the device satisfies the preset dormancy configuration parameter; and control the upper layer logic component in the device to enter the low power consumption state.

In different software and hardware implementation solutions of the apparatus, the low power consumption control module may also be configured to, when identifying that the current state parameter of the device satisfies the preset dormancy configuration parameter, control a CPU in the device to enter a dormant state or lower the dominant working frequency of the CPU.

Based on the above technical solution, the wake-up control module may be specifically configured to identify an energy detection state check bit of a physical port in a polling manner by using a serial management interface connected to a physical chip; determine the energy consumption state of the transmission medium corresponding to the physical port according to the identified energy detection state check bit; and when the energy consumption state of the corresponding transmission medium is detected active, wake up the upper layer logic component in the device to enter the normal working state.

The wake-up control module may be configured to determine, according to a preset configuration policy, a wake-up physical port; detect the energy consumption state of the corresponding transmission medium by using the wake-up physical port; and when the energy consumption state of the corresponding transmission medium is detected active, wake up the upper layer logic component in the device to enter the normal working state.

The apparatus for implementing low power consumption for data switching device may further include a countdown wake-up module 530, as shown in FIG. 5. The countdown wake-up module 530 is configured to, after the low power consumption control module 510 controls the upper layer logic component in the device to enter the low power consumption state, trigger a timing operation; and wake up the upper layer logic component in the device to enter the normal working state when a timing value reaches a preset countdown value.

The apparatus for implementing low power consumption for data switching device provided in the embodiment is capable of performing the method for implementing low power consumption for data switching device provided in any embodiment, and has a corresponding functional module, which is equivalent to the dormancy management module described above. The apparatus for implementing low power consumption for data switching device can implement an energy-saving design, enabling the data switching device to complete the automatic detection and enter the low power consumption state according to the preset dormancy configuration parameter, and automatically detect wake-up.

An embodiment further provides data switching device, including an upper layer logic component and a physical layer chip, where the physical layer chip is arranged with a physical port, and the device further includes the apparatus for implementing low power consumption for data switching device provided in the embodiment.

The low power consumption control module and the wake-up control module may be integrated in a CPU to form a dormancy management module, as shown in FIG. 2B. Or, the low power consumption control module is integrated in the CPU, and the wake-up control module is integrated in a wake-up chip and connected to the CPU and the physical port respectively, as shown in FIG. 3B.

The technical solutions provided in the embodiments are targeted at a design directed to saving energy during an idle time period of network devices for data switching, such as data switching device, with a better cross-field application basis. As long as the device includes a PHY chip and an upper layer logic component, idleness detection and wake-up operations may be performed by using the solutions provided in the embodiments. Therefore, the data switching device provided in the embodiments may be a switch, a router, a gateway, or a firewall server.

According to the technical solutions provided in the embodiments, in a dormant mode, the upper layer logic components, such as the CPU and link switching chip (LSW) all automatically enter the low power consumption state, and the PHY chip enters the energy consumption detection mode. In this way, the functions of entering the dormant state of the data switching device under preset conditions, for example, an idle time period, and automatically waking up by using the physical port are implemented, which greatly lower power consumption of the device. When the device is dormant and service demands are presented on the physical port, the device is capable of automatically waking up without on-site and manual intervention.

Persons of ordinary skill in the art should understand that all or part of the steps of the method in the embodiments may be implemented by a program instructing relevant hardware. The above program may be stored in a computer readable storage medium. When the program is executed, the steps in the method embodiments are executed. The storage medium includes various media capable of storing program codes, such as a ROM, a RAM, a magnetic disk or a CD-ROM.

Finally, it should be noted that the above embodiments are merely exemplary and are not understood to limit the scope of the claims. It is understood that persons of ordinary skill in the art could modify the embodiments or make equivalent substitutions to some or all the technical features thereof, and that such modified embodiments are understood to fall within the scope of the claims.

What is claimed is:

1. A method for implementing low power consumption for a data switching device, wherein the data switching device comprises a wake-up physical port and a non-wake-up physical port, the method comprises:
controlling an upper layer logic component in the data switching device to enter into a low power consumption state, when a current state parameter of the data switching device satisfies a preset dormancy configuration condition, wherein the upper layer logic component comprises at least one of a central processing unit (CPU) and a network processor;
detecting whether an energy consumption state of a transmission medium corresponding to the wake-up physical port is active, wherein the detecting comprises:
identifying an energy detection state check bit of the wake-up physical port in a polling manner by using a serial management interface connected to a physical chip on which the wake-up physical port is arranged; and
determining the energy consumption state of the transmission medium corresponding to the wake-up physical port according to the identified energy detection state check bit; and
waking up the upper layer logic component in the data switching device to enter into a normal working state if the energy consumption state of the transmission medium corresponding to the wake-up physical port is active;
wherein an energy consumption state of a transmission medium corresponding to the non-wake-up physical port is active is not used as a condition for waking up the upper layer logic component.

2. The method according to claim 1, wherein the current state parameter of the data switching device satisfies the preset dormancy configuration condition when a current time of the device falls within a preset dormancy time period.

3. The method according to claim 1, wherein the controlling of the upper layer logic component in the data switching device to enter the low power consumption state comprises:
controlling the CPU in the data switching device to enter into a dormant state, or lowering a dominant working frequency of the CPU.

4. The method according to claim 1, wherein after controlling the upper layer logic component in the data switching device to enter into the low power consumption state, the method further comprises:
triggering a timing operation and waking up the upper layer logic component in the data switching device to enter into the normal working state when a timing value reaches a preset countdown value.

5. A networking device comprising:
an upper layer logic component, wherein the upper layer logic component comprises at least one of a central processing unit (CPU) and a network processor;
a physical layer chip, wherein the physical layer chip being arranged with a wake-up physical port and a non-wake-up physical port; and
an apparatus for implementing low power consumption for a data switching device wherein the apparatus for implementing low power consumption is configured to:
control the upper layer logic component to enter into a low power consumption state, when a current state parameter of the device satisfies a preset dormancy configuration condition;
detect whether an energy consumption state of a transmission medium corresponding to one physical port is active, and
wake up the upper layer logic component to enter into a normal working state if the energy consumption state of the transmission medium corresponding to the wake-up physical port is active, wherein an energy consumption state of a transmission medium corresponding to the non-wake-up physical port is active is not used as a condition for waking up the upper layer logic component, wherein the apparatus for implementing low power consumption further comprises:
a low power consumption control module configured to control the upper layer logic component to enter into the low power consumption state when the current state parameter of the data switching device satisfies the preset dormancy configuration condition; and
a wake-up control module configured to:
detect whether the energy consumption state of the transmission medium corresponding to the wake-up physical port is active, and wake up the upper layer logic component to enter into the normal working state if the energy consumption state of the transmission medium corresponding to the wake-up physical port is active; and identify an energy detection state check bit of the wake-up physical port in a polling manner by using a serial management interface connected to the physical chip on which the wake-up physical port is arranged;

determine whether the energy consumption state of the transmission medium corresponding to the wake-up physical port according to the identified energy detection state check bit; and wake the upper layer logic component to enter into the normal working state if the energy consumption state of the transmission medium corresponding to the wake-up physical port is active.

6. The networking device according to claim 5, wherein the low power consumption control module is integrated in the CPU of the data switching device, and the wake-up control module is integrated in a wake-up chip and connected to the CPU and the wake-up physical port respectively.

7. The networking device according to claim 5, wherein the low power consumption control module is configured to determine that the current state parameter of the data switching device satisfies the preset dormancy configuration condition when a current time of the data switching device falls within a preset dormancy time period; and control the upper layer logic component to enter into the low power consumption state.

8. The networking device according to claim 5, wherein the apparatus for implementing low power consumption further comprises:

a countdown wake-up module configured to, trigger a timing operation after the low power consumption control module controls the upper layer logic component to enter into the low power consumption state; and wake up the upper layer logic component to enter into the normal working state when a timing value reaches a preset countdown value.

9. The networking device according to claim 5, wherein the low power consumption control module and the wake-up control module are integrated in the CPU of the device.

10. The networking device according to claim 5, wherein the low power consumption control module is integrated in the CPU of the device, and the wake-up control module is integrated in a wake-up chip and connected to the CPU and the wake-up physical port respectively.

* * * * *